June 5, 1962 J. E. HECKETHORN 3,037,600
TWO SPEED ACCESSORY DRIVE
Filed June 8, 1959 3 Sheets-Sheet 1
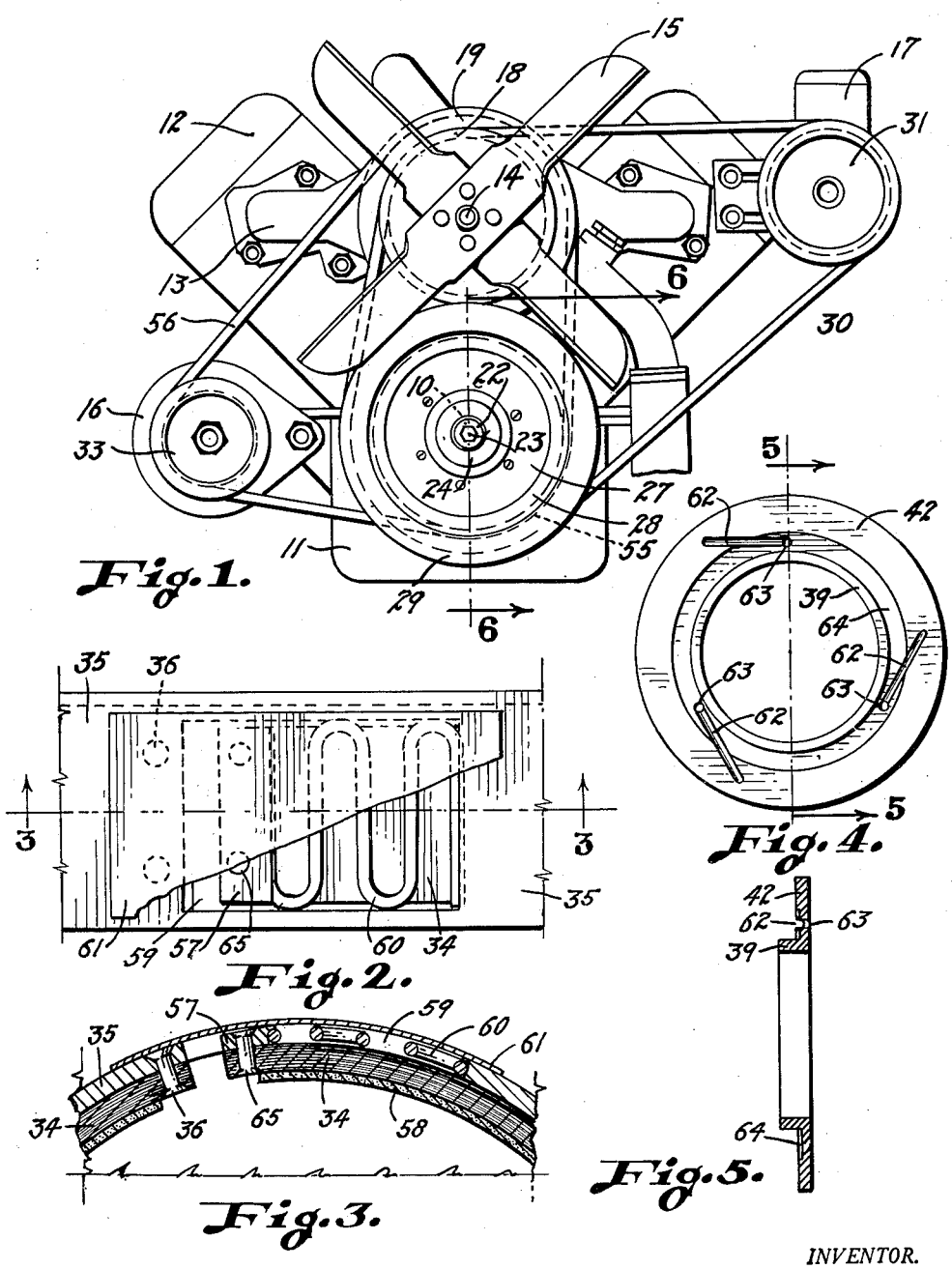
INVENTOR.
JOHN E. HECKETHORN
BY
ATTORNEY

INVENTOR.
JOHN E. HECKETHORN

June 5, 1962 J. E. HECKETHORN 3,037,600
TWO SPEED ACCESSORY DRIVE

Filed June 8, 1959 3 Sheets-Sheet 3

INVENTOR.
JOHN E. HECKETHORN
BY
ATTORNEY

United States Patent Office 3,037,600
Patented June 5, 1962

3,037,600
TWO SPEED ACCESSORY DRIVE
John E. Heckethorn, Dyersburg, Tenn., assignor to Heckethorn Manufacturing & Supply Company, Dyersburg, Tenn., a corporation of Colorado
Filed June 8, 1959, Ser. No. 818,906
2 Claims. (Cl. 192—45.1)

This invention relates to means for driving the various accessories which are driven from the engine of an automotive vehicle, such as the cooling fan, the water pump, the electric generator, the compressor of a refrigeration or air conditioning unit, etc. Heretofore, these accessories have been driven directly, through the medium of the V-belts, from the crank shaft of the engine. Such a drive functioned satisfactorily in the days of low speed cars. Present day vehicles however, spend a large portion of their life at exceedingly low town speeds but are capable of and upon occasion do travel at exceedingly high speeds at times in excess of one hundred miles per hour. The result is, that a direct one speed drive, which will drive the accessories at proper operating speed at low car speeds, will drive the accessories at destructive speeds under high car speeds.

The principal object of this invention is to provide a highly efficient two-speed drive by means of which the accessories will be driven at a relatively high speed ratio when the engine is rotating at a relatively low speed, so as to provide efficient accessory operation when the vehicle is being driven at low town speeds, and which will automatically shift the accessory drive ratio to a low ratio when the engine speed exceeds a predetermined speed so as to prevent damage to the accessories from overspeeding.

The invention relates more particularly to variable or automatic ratio controlling drives such as described in applicant's co-pending applications bearing Serial Nos. 761,258, now Patent No. 3,019,874, granted February 6, 1962 and 721,735, now Patent No. 2,910,891. These prior applications describe shift ratio devices operable in consequence of the centrifugal expansion of a clutch band. The operation of such devices has been found upon occasion to be erratic due to variations in the material and weight of the band material and to wear upon the band linings. Also it has been difficult to obtain sufficient weight for efficient centrifugal operation of the band without materially effecting the flexibility thereof.

Another object of this invention is to provide a centrifugally-operated band that will have sufficient weight for accurate and proper centrifugal action; which will be exceedingly flexible and resilient so as to obtain a highly efficient wrapping or clutching action; and to provide a clutch band construction which will maintain exceedingly accurate torque and shift speed characteristics throughout the entire life of the engine regardless of wear.

In the prior co-pending applications, the use of eccentric roller sprags was suggested for directional clutching purposes. It was found exceedingly difficult to obtain uniformly perfect results from roller sprags in an accessory drive due to slight eccentricities in the V-belt pulleys and to side strains and tilts such as are imparted by multiple V-belts due to slight differences in tension between individual belts. A further object of this invention is to provide a sprag assembly which will avoid the above difficulties and which will provide a perfect and uniform sprag clutching function at all times.

A further difficulty encountered with variable accessory drives results from inefficient lubrication of the elements. Due to the high speeds encountered, the lubricating oil will be thrown radially outward by centrifical action thus starving the axial portions of the device while overlubricating and overflowing the peripheral portions of the rotating elements. A still further object of this invention is to provide a highly efficient lubrication control in a sprag type clutch which will provide efficient lubrication at all times without overflow, leakage, or loss.

Other objects and advantages reside in the detail construction of the invention, which is designed for simplicity, economy, and efficiency. These will become more apparent from the following description.

In the following detailed description of the invention, reference is had to the accompanying drawings which form a part hereof. Like numerals refer to like parts in all views of the drawings and throughout the description.

In the drawings:

FIG. 1 is a somewhat diagrammatic front view of a conventional automotive engine showing the location of conventional accessory units relative to the crank shaft of the engine and showing the improved driving means in place thereon;

FIG. 2 is an enlarged fragmentary detail side view of a clutch housing as used in this invention illustrating a clutch-band-tensioning spring employed therein;

FIG. 3 is a similarly enlarged fragmentary detail section taken on the line 3—3, FIG. 2;

FIG. 4 is a detail view showing the outer face of a sprag thrust ring as employed in this invention;

FIG. 5 is a vertical cross section through the thrust ring of FIG. 4, taken on the line 5—5, FIG. 4;

Figure 6:
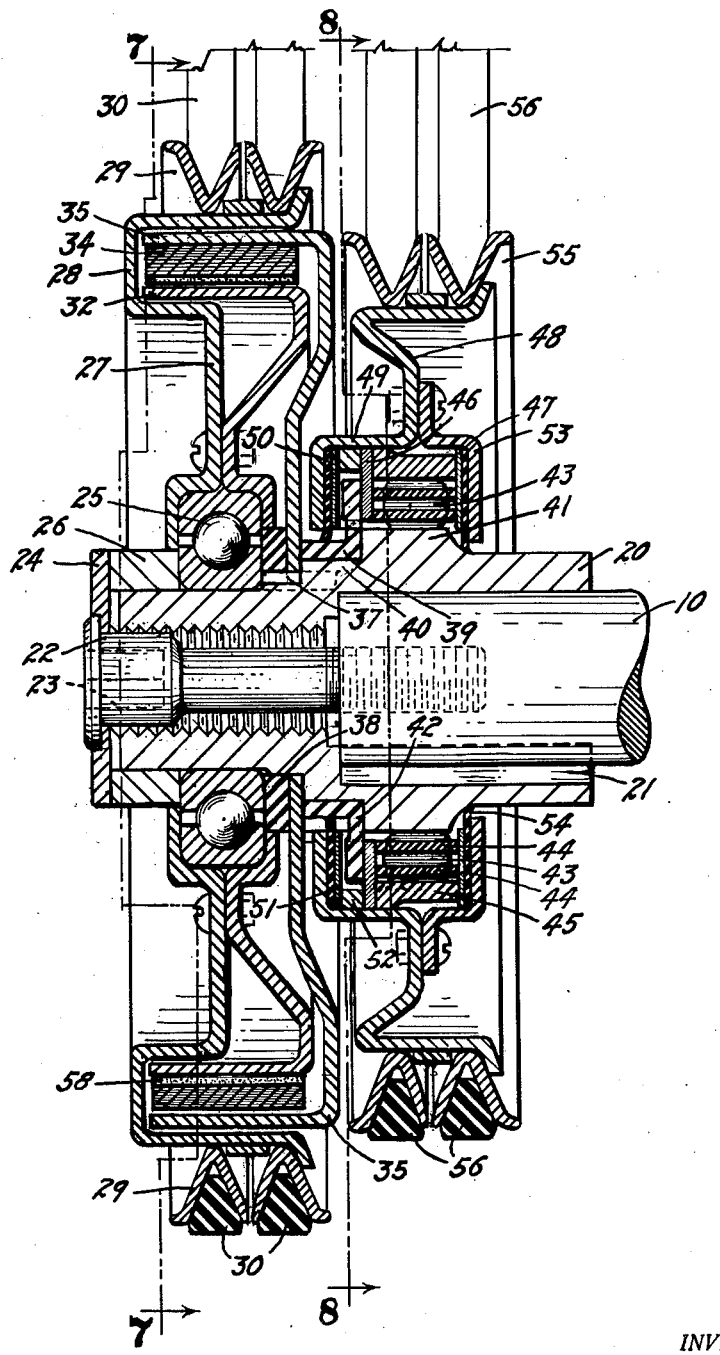
FIG. 6 is an enlarged vertical axial section through the variable drive elements of the invention taken on the line 6—6, FIG. 1.
Figure 7:
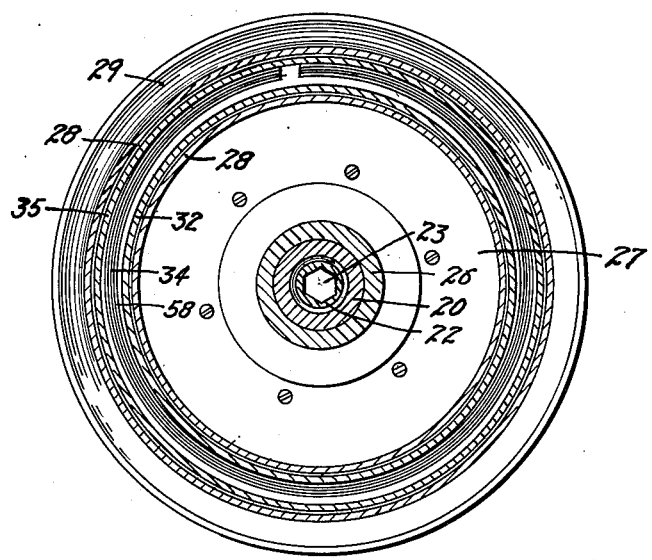
Figure 8:
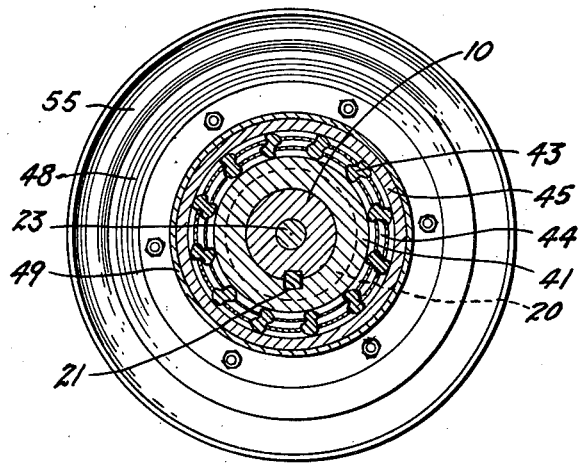
Figure 9:
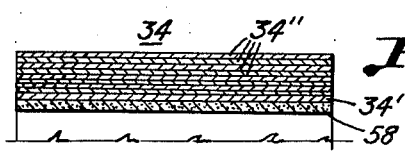

FIGS. 7 and 8 are reduced scale cross sections through the drive elements taken on the lines 7—7, and 8—8, FIG. 6, respectively; and, FIG. 9 is a magnified cross section through a clutch band as employed in the invention.

The location of the various elements of the improved two-speed accessory drive can be ascertained from FIG. 1, in which, conventional elements of an automotive engine system are designated by numeral as follows: crank shaft 10, pan 11, engine block 12, water pump 13, water pump shaft 14, cooling fan 15, generator 16, generator driven pulley 33, refrigerant compressor 17 and compressor driven pulley 31. This invention is designed to drive the water pump shaft 14, the generator driven pulley 33, and the compressor driven pulley 31 from the crank shaft 10 at a low speed ratio when the crank shaft is rotating rapidly and at a high speed ratio when the crank shaft is rotating slowly.

To accomplish this, a double, multiple driven pulley having a relatively small double-grooved pulley portion 18 and a relatively large double-grooved pulley portion 19 is concentrically and fixedly mounted on the water pump shaft 14 with the smaller pulley portion 18 positioned forwardly of the larger pulley portion 19. The pulley portions 18 and 19 are driven as a unit by means of the V-belts (to be later described) from a variable drive mechanism mounted on the crank shaft 10 and shown more in detail in FIG. 6.

The variable drive mechanism comprises a tubular hub 20 which is fitted over the forward extremity of the crank shaft 10 and keyed thereto by means of a suitable key 21. The hub 20 is secured on the crank shaft by means of a screw 22 which is axially threaded into the extremity of the crank shaft 10. The screw 22 has an enlarged, flanged head 23, provided with an Allen wrench socket, which acts to retain a retaining washer 24 in place on the extremity of the crank shaft which in turn acts to retain and clamp the elements of the mechanism together upon the hub 20. As illustrated, the retaining washer 24 retains the following elements against each other and against an enlarged cylindrical inner sprag track 41 on the hub 20, to wit: a spacing element 26, a ball bearing assembly 25, a spacer ring 38, a clutch housing 35 and a thrust ring 42. In acting against the latter assembly of elements, the retaining washer also acts to clamp the hub against the extremity of the crank shaft 10. Thus it can be seen that all of the enumerated elements and the hub 20 can be clamped into position by simply tightening the axial screw 23. On certain types of automotive engines, the spacing element 26 may be a conventional shaft balancing mechanism which has not been illustrated since it forms no part of the present invention.

A large drive pulley 27 is rotatably mounted on the ball bearing assembly 25. The large pulley 27 is contoured forwardly adjacent its periphery to form an annular clutch band channel 28 therein thence extends rearwardly about the channel 28 to provide support for two V-belt grooves 29 which are welded thereto in parallel, closely spaced relation concentric of the axis of the crank shaft 10. Two high ratio V-belts 30 engage in the belt grooves 29 and are trained about the smaller pulley portion 18 of the water pump shaft 14 thence about the compressor driven pulley 31 so that the rotation of the large drive pulley 27 will be transmitted to the pump shaft 14 and to the compressor 17.

A clutch drum 32 is welded to the inner face of the large drive pulley 27 so that the two members form an annular housing around the ball bearing assembly 25. The periphery of the clutch drum 32 extends forwardly within the clutch channel 28 of the pulley 27. The clutch housing 35 is peripherally flanged and the flange thereof extends forwardly within the clutch band channel 28 to surround the clutch drum 32 in annular, radially-spaced relation thereto. The clutch housing 35 is keyed upon the hub 20 by means of suitable keys 37. The spacing ring 38 is welded or otherwise formed on the housing 35 and also engages the keys 37 to provide reinforcement and to serve to space the clutch housing 35 from the ball bearing assembly 25. A clutch band, designated in its entirety by the numeral 34, is secured to and mounted within the clutch housing 35, as will be later described, and frictionally engages the clutch drum 32.

It can be seen from the above that the clutch housing 35 will always rotate with the crank shaft 10 and, if the clutch band 34 is in engageable relation with the clutch drum 32, the drive V-belt grooves 29 will rotate with the crank shaft to drive the high ratio belts 30. When a predetermined crank shaft speed is reached, the clutch band 34 will expand centrifugally to release the clutch drum 32 so that the high ratio belts 30 will no longer be driven from the large drive pulley 27. The clutch housing 35 bears against the outer face of an annular sleeve 39 formed on the thrust ring 42. The thrust ring is fitted over a shoulder 40 on the hub 20 and against the inner sprag track 41 and the thrust ring 42 projects radially outward about the forward edge of the inner sprag track 41. A plurality of tiltable clutch sprags 43, maintained in spaced relation by means of sprag rings 44, surround and contact the inner sprag track 41. An outer sprag track 45 surrounds and encloses the sprags 43. The sprag assembly, consisting of the inner sprag track 41, the sprags 43, the sprag rings 44, and the outer sprag track 45 are conventional and are obtainable on the market under various names such as "Borg-Warner Sprags."

The sprags 43 and the outer sprag track 45 are confined between a forward thrust washer 46 and a rear thrust washer 47 which surround the inner sprag track 41 forwardly and rearwardly of the outer sprag track 45. A small drive pulley 48 is welded or otherwise fixedly mounted on and surrounds the outer sprag track 45. The small pulley 48 is formed with a cylindrical, forwardly projecting cup portion 49 extending first forward toward the clutch housing 35 thence axially inward parallel to the latter. A flat flexible annular forward sealing gasket 50 is positioned within the cup portion 49 so as to bear in sealing engagement with the sleeve 39 of the thrust ring 42. A forward gasket washer 51 is clamped between the forward sealing gasket 50 and a spacer ring 52 which in turn is clamped against the forward thrust washer 46 so as to maintain the forward gasket washer 51 separated from the forward thrust washer 46. The spacer ring 52 has a slightly greater thickness than the thrust ring 42 to allow free space for relative rotation of the thrust ring.

A hub cup member 53, welded or otherwise secured to the rear face of the small drive pulley 48, extends rearwardly and inwardly about the rear of the sprag assembly to provide an annular concentric channel forming a complete enclosure for said hub assembly. A rear sealing gasket 54 similar to the gasket 50 is positioned between the cup member 53 and the rear thrust washer 47 and extends axially inward into engagement with the hub 20.

The sprags 43 are normally inclined so as to prevent the outer sprag track 45 and the small drive pulley 48 from rotating at a slower speed than the inner sprag track 41, and the crank shaft 10, but will allow the small drive pulley 48 and the outer sprag track to rotate at a higher speed than the crank shaft 10. The peripheral edge of the small drive pulley 48 is flanged to form an annular seat for two annular V-belt pulley grooves 55 which are welded or otherwise fixedly mounted thereon. A second pair of endless V-belts, designated as the "low ratio belts 56," are trained about the V-belt grooves 55 of the small drive pulley 48 thence about the large driven pulley portion 19 on the pump shaft 14 thence about the generator pulley 33.

It is desired to call particular attention to the construction of the clutch band 34. The band is laminated and in the preferred construction, comprises an innermost lamination 34′ of .020 inch thickness and 8 additional laminations 34″ of .012 inch thickness all of dead soft steel. The leading extremities of the laminations are riveted to the clutch housing 35 as shown at 36. The trailing extremities of the laminations are riveted, as shown at 65, or otherwise secured to an external terminal spring block 57. A lining 58 of friction material is cemented or welded to the innermost band so as to contact the clutch drum 32. The spring block extends outwardly into a spring opening 59 stamped in the clutch housing 35 and a "zig-zag" type of compression spring 60 is positioned in the spring opening and compressed between the block 57 and a terminal wall of the opening, as shown in FIGS. 2 and 3, so as to exert a contracting bias on the clutch band 34 at all times. The "zig-zag" spring 60 is maintained in position in the opening 59 by means of a suitable spring retainer plate 61 welded or otherwise secured to the external surface of the clutch housing over the opening 59.

*Operation*

Let us assume that the crank shaft 10 is rotating clockwise at a comparatively slow speed, that is, below 1500 r.p.m. and that the clutch band 34 is contracted against the clutch drum 32 by the action of the "zig-zag" spring 60. Under such conditions, the torque of the crank shaft 10 will be transmitted through the clutch housing 35, and the clutch band 34 to the clutch drum 32 so as to rotate the large drive pulley 27 and its grooves 29 at crank shaft speed. This rotation is transmitted to the small pulley portion 18 and the pump shaft 14 and to the compressor pulley 31. The pulley portion 18 is of lesser diameter than the drive pulley 27 so that both the pump shaft 14 and the compressor pulley 31 will be rotated at a higher-than-crank-shaft speed. This "higher" speed will be transmitted to the large pulley portion 19 and from thence through the low ratio belts 56 to the generator drive pulley 33 and to the small drive pulley 48 to rotate the latter at a faster-than-crank-shaft speed with the outer sprag track 45 overriding the sprags 43. Thus all accessories will be driven at or above crank shaft speed.

Now let us assume that the crank shaft speed is increased, for instance, to 1500 r.p.m. This will generate sufficient centrifugal force in the clutch band 34 to expand the latter radially outward against the bias of the spring 60. The instant this occurs, the friction lining 58 will release the clutch drum 32 so that torque is no longer applied to the large drive pulley 27. This allows the small drive pulley to drop back to crank shaft speed so that the sprags 43 will swing toward the erect or clutching position to clutch the outer sprag track 45 to the inner sprag track 41 to lock the small drive pulley 48 to the crank shaft 10 while the large drive pulley 27 rotates freely on the ball bearing assembly 25. This instantly reduces the speed ratio since the small drive pulley 48 will now supply torque through the low ratio belts 56 to the compressor 17 and to the large pulley portion 19 to rotate the pump shaft 14 at reduced ratio. The large pulley portion 19 will now transmit torque to the generator pulley 33 and to the large drive pulley 27 at reduced ratio. The reduced ratio continues to function until the crank shaft speed again drops below 1500 r.p.m. so as to reduce the centrifugal force sufficiently to allow the clutch band 34 to contract into gripping engagement with the clutch drum 32 to again directly connect the large drive pulley 27 as previously described.

With a band construction as above described and with a "zig-zag" spring having a fifteen pound compression, a shifting speed of approximately 1500 r.p.m. is obtained with the release and engaging speeds remaining within 100 r.p.m. of each other. In other words, if the centrifugal clutch band 34 releases the clutch drum at 1500 r.p.m., it will always re-engage the clutch drum at some speed somewhere between 1400 r.p.m. and 1500 r.p.m. One hundred foot pounds of static torque is obtained with an active lining area of only 22.8 square inches. The laminated band acts in the nature of a soft leather strap due to the fact that the laminations act independently and each individual lamination is soft and flexible. Therefore, a high torque is provided in the critical, static and low r.p.m. ranges since the band can adjust quickly to the outside diameter of the clutch drum.

It is also desired to call attention to the lubrication of the sprag assembly. Lubricant is introduced in the enclosure between the sealing gaskets 50 and 54. During rotation, there is a tendency for the lubricant to move radially and tangentially outward. Therefore, the sprags and the outer periphery of the thrust ring 42 are always operating in lubricant. To prevent excess lubricant pressure from being built up at the periphery, the thrust ring 42 is provided with a plurality of inclined grooves 62 in its forward face, as shown in FIGS. 4 and 5 which tend to deflect the rotating lubricant axially inward to relatively small relief holes 63 which extend through the thrust ring and act to continuously return the lubricant to the axial portion of the sprag assembly. Therefore, a constant circulating supply of lubricant is provided for the sprag assembly and leakage of lubricant and the entrance of foreign matter is resisted by the flexed sealing gaskets 50 and 54.

It will be noted that the axial portion of the shift ring 42 adjacent the sleeve 39 is indented as shown in FIGS. 4 and 5 to provide an annular oil pocket 64 for the accumulation of oil being returned by the oil grooves 62. The accumulated oil in the pocket feeds slowly through the holes 63 to the sprags during operation. In actual practise, the oil pocket 64 has a depth of .005", sufficient to prevent closure of the holes 63 by the adjacent sealing gasket washer 51.

When the hub cup member 53 is pressed and welded to the small drive pulley 48, the enclosed elements 42, 45, 46, 47, 50, 51, 52 and 54 are firmly pressed together as a unit which is rigid with the pulley 48. If desired, the rigidity can be insured by welding the outer sprag track 45 to the cup portion 49.

The thrust ring 42 acts to accurately position the sprag assembly on the inner sprag track and positively prevents lateral tilting movements of the small drive pulley 48 should there be unequal tensions between the two low ratio belts 56.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. A directional clutch assembly for mounting a pulley on and in driven relationship to a drive shaft comprising: a hub secured to said drive shaft, an inner sprag track formed on and projecting from said hub; an annular plurality of tiltable clutch sprags rotatably mounted on said inner sprag track; an outer sprag track rotatably surrounding said sprags; a pulley for transmitting power to a drive belt, said pulley having an annular concentric channel in the center thereof, said outer sprag track being fixedly mounted in said channel, said outer sprag track having a forward annular face and a rear annular face, said forward annular face being in spaced relation to the side of said channel; a thrust ring mounted on said hub forwardly of said inner sprag track, said ring projecting into said channel and acting to prevent axial movement of said sprags on said inner sprag track; and a forward thrust washer positioned between the forward face of said outer sprag track and said thrust ring and in frictional engagement with both.

2. A directional clutch assembly as defined in claim 1 and further including a hub cup member mounted on said pulley and containing the rear face of said annular sprag track; a rear thrust washer positioned against the rear face of said outer sprag track; a forward sealing gasket mounted in said channel and a rear sealing gasket mounted in said hub cap member, said two gaskets frictionally contacting said hub to hermetically seal said sprags in the enclosure of said channel and said hub cap member.

References Cited in the file of this patent

UNITED STATES PATENTS

| | | |
|---|---|---|
| 1,983,827 | Winther et al. | Dec. 11, 1934 |
| 1,994,141 | Madden | Mar. 12, 1935 |
| 2,154,212 | Moorhouse | Apr. 11, 1939 |
| 2,225,072 | Meyerhoefer | Dec. 17, 1940 |
| 2,404,092 | Reynolds | July 16, 1946 |
| 2,678,117 | Birbaum | May 11, 1954 |
| 2,694,937 | Birbaum | Nov. 23, 1954 |
| 2,762,482 | Davis | Sept. 11, 1956 |
| 2,809,535 | Hein et al. | Oct. 15, 1957 |
| 2,863,545 | Spase | Dec. 9, 1958 |
| 2,866,349 | Heckethorn | Dec. 30, 1958 |
| 2,879,873 | Spase | Mar. 31, 1959 |
| 2,910,891 | Heckethorn | Nov. 3, 1959 |
| 2,940,567 | Dodge | June 14, 1960 |
| 2,955,478 | Davis | Oct. 11, 1960 |

FOREIGN PATENTS

| | | |
|---|---|---|
| 129,701 | Australia | Oct. 28, 1948 |